Patented May 7, 1946

2,399,692

UNITED STATES PATENT OFFICE 2,399,692

ALKYD RESIN

Ernest G. Peterson, Wilmington, Del., assignor to Hercules Powder Company, Wilmington, Del., a corporation of Delaware No Drawing. Application November 12, 1941, Serial No. 418,801

8 Claims. (Cl. 260—26)

This invention relates to improved alkyd resins of the modified type and more particularly to resins of this type obtained by esterification of polymerized rosin and an $\alpha,\beta$-unsaturated organic polybasic acid with a polyhydric alcohol. It also relates to the formation of an adduct of polymerized rosin with an $\alpha,\beta$-unsaturated organic polybasic acid.

Rosin modified, maleic anhydride-polyhydric alcohol resins have been known for some time. Generally they have been prepared by the condensation of glycerol, maleic anhydride, and either wood or gum rosin. The melting point of these prior resins is chiefly contingent upon the quantity of maleic anhydride used in the preparation but is also partially contingent upon the quantity of glycerol used for esterification. A marked difficulty has been that in order to prepare a resin having high melting point, so much maleic anhydride must be used that the resulting resin approaches the gel stage and has poor compatibility with oils and solvents. Consequently, when the resulting resin is used in the preparation of varnishes, an expensive solvent mixture must be used to prevent separation of the resin. When the resulting resin is used in varnishes or lacquers, the quantity of mineral spirits which can be employed as diluent is very limited. Attempts have been made prior to this invention to overcome these difficulties by reducing the quantity of glycerol used in the preparation of the resin, but the resulting resins have high acid numbers and contribute poor alkali and poor water resistance to their coatings.

Now, in accordance with this invention, a new series of alkyd resins utilizing maleic anhydride or other $\alpha,\beta$-unsaturated organic polybasic acid is provided containing polymerized rosin as the modifying agent. It has been found that polymerized rosin is capable of forming an adduct with an $\alpha,\beta$-unsaturated organic polybasic acid such as maleic anhydride, and that on esterification of such an adduct with a polyhydric alcohol or by joint esterification of polymerized rosin, maleic anhydride or other $\alpha,\beta$-unsaturated organic polybasic acid, and a polyhydric alcohol, improved alkyd resins are provided possessing high melting points without the the disadvantages of the prior rosin modified maleic anhydride alkyd resins. The improved resins utilizing polymerized rosin are more economical to prepare than the prior rosin modified maleates since they require less of the relatively expensive maleic anhydride to achieve the same melting point range. They also provide much higher melting and harder resins without gelation and without materially reduced solvency and compatibility characteristics, as compared with the former rosin modified maleates. They also contribute improved drying characteristics to varnish films containing them.

As the $\alpha,\beta$-unsaturated organic polybasic acid employed in preparing the resins of the present invention it is preferred to use maleic anhydrides. Other related acids which may be used are fumaric acid, itaconic acid, citraconic acid, etc. Maleic acid may be used in place of the anhydride, if desired, and is to be considered the equivalent thereof.

As the polyhydric alcohol employed in the preparation of the resins of the present invention, I may use any of the glycols such as ethylene glycol, propylene glycol, trimethylene glycol, butylene glycol, diethylene glycol, triethylene glycol, tetraethylene glycol, etc., glycerol, butantriol, pentaglycerol, trimethylolmethane, erythritol, pentaerythritol, diglycerol, mannitan, sorbitan, dulcitan, iditan, talitan, adonitol, arabitol, xylitol, mannitol, sorbitol, dulcitol, iditol, talitol, lactositol, etc. The foregoing polyhydric alcohols may be used either singly or in admixture with one another. Glycerol is preferred.

The polymerized rosin utilized may be formed by the polymerization of any type of natural or refined rosin, for example wood rosin, gum rosin, heat-treated rosin, or any of the rosin acids contained therein, as abietic acid, pimaric acid, sapinic acid, etc., with any of the polymerizing agents used in polymerization of rosin, such as, for example, sulfuric acid, boron trifluoride, phosphoric acid, tetraphosphoric acid, hydrofluoric acid, aluminum chloride, stannic chloride, the rosin-sulfuric acid sludge catalyst described in an application of Clell E. Tyler, Serial No. 328,864, now U. S. Patent No. 2,288,659, etc. The polymerized rosin, if desired, may be treated to refine and decolorize it as, for example, with selective solvents such as furfural, phenol, aniline, etc., or with selective adsorbents such as fuller's earth, activated clay, kieselguhr, etc., or it may be refined by heat-treating at 250° to 325° C. or by treatment with nascent hydrogen. The polymerized rosin employed will usually have a drop melting point ranging from about 90° C. to about 135° C., and preferably at least about 100° C. The polymerized rosin will generally have an acid number from about 120 to about 175, depending on the rosin used and the particular polymerization treatment employed.

A preferred procedure for the preparation of the modified alkyd resins of the present invention involves first heating the polymerized rosin with maleic anhydride, or other α, β-unsaturated organic polybasic acid, to a temperature within the range of from about 160° C. to about 250° C. for from about 30 minutes to about 3 hours to form an adduct of the polymerized rosin and the polybasic acid, then adding the polyhydric alcohol and carrying out the esterification thereof at a temperature ranging from about 200° C. to about 300° C. depending upon the boiling point of the particular polyhydric alcohol or mixture of polyhydric alcohols employed. The reaction temperature during esterification is held at this latter point until the resin has a desired acid number below about 35. When such a desired acid number has been obtained, the reaction mixture is sparged with an inert gas such as steam, nitrogen, carbon dioxide, etc., or is evacuated, or is subjected to a combination of sparging and evacuating to remove unreacted polyhydric alcohol and any other volatile products present.

Preferably the formation of the adduct and of the resin is carried out in an inert atmosphere to prevent discoloration of the resin. This may be attained by bubbling an inert gas such as nitrogen, carbon dioxide, etc., through the reaction mixture throughout the procedure.

The adduct formed by the reaction of the polymerized rosin and the maleic anhydride, or other α, β-unsaturated organic polybasic acid, may be cooled and later esterified. This adduct is a resinous material adapted to be employed in any desired manner, usually to be later esterified. It may be used by itself as a high melting point substitute for polymerized or unpolymerized rosin.

Instead of the preferred stepwise procedure described above, a mixture of the polymerized rosin, the maleic anhydride and the polyhydric alcohol may be heated to the esterification temperature and held there for a sufficient period of time to simultaneously effect adduct formation and esterification. Other procedures may be used within the skill of those versed in the art.

Preferably as raw materials I employ polymerized rosin, maleic anhydride, and glycerol, and preferably no other reactant is present in significant amounts during the reaction. When preparing this type of resin from about 1 to about 16 parts of maleic anhydride to 100 parts of polymerized rosin may be used. However, when using from 13.5 to 16 parts of maleic anhydride per 100 parts of polymerized rosin, it is necessary to reduce the quantity of glycerol present to about 20% less than theoretical requirements in order to avoid gelation. If a dihydric alcohol be substituted in part for the trihydric glycerol, this difficulty may be avoided. The preferred range when employing glycerol and maleic anhydride is from about 5 to about 13½ parts of maleic anhydride by weight to 100 parts of polymerized rosin. Considering the product obtained by the reaction of polymerized rosin, glycerol and maleic anhydride in such proportions as a mixture of glycerol esters, this corresponds to from about 6% to about 16% of glyceryl maleate and from about 94% to about 84% of polymerized rosin glyceride. The same ranges are applicable when a polyhydric alcohol other than glycerol is employed.

The amount of glycerol employed may vary from about 20% less than theoretical requirements to about 20% in excess of theoretical requirements. Preferably, an amount of glycerol at least equal to the theoretical requirement is employed.

The present invention presents an advantage in that, generally speaking, the melting point of the product made with polymerized rosin is unexpectedly higher than the melting point of an identical product made with unpolymerized rosin by an amount greater than the increase in melting point of the polymerized rosin over the unpolymerized rosin. For example, using identical proportions of reaction materials and identical reaction conditions, a product made with polymerized wood rosin having a melting point of say 100° C. will have a melting point more than 20° C. above the melting point of an identical product made with the same wood rosin unpolymerized and having a melting point of 80° C. Another advantage of the present invention is that, generally speaking, the amount of expensive maleic anhydride required is disproportionately lower than would be expected from the differences in melting point between ordinary rosin and the same rosin polymerized. To illustrate, a resin made in accordance with the present invention from 11.5 parts by weight of maleic anhydride, 100 parts of polymerized wood rosin having a melting point of 100° C., and the theoretical amount of polyhydric alcohol as glycerol has a melting point equal to a resin made in the same manner from 16 parts of maleic anhydride, 100 parts of the unpolymerized wood rosin having a melting point of 80° C. and the theoretical amount of the same polyhydric alcohol. In other words, a 39% increase in the amount of maleic anhydride is required in the case of the unpolymerized rosin to give a melting point equal to that of the product made with the polymerized rosin having a melting point only 25% above that of the unpolymerized rosin.

The high melting point of the resins of the present invention is contrary to normal expectation. It would be expected that since polymerized rosin is less saturated than normal rosin, it would react to a less extent with maleic anhydride forming less of the adduct to the formation of which is attributable the increase in melting point effected by the use of maleic anhydride with rosin materials.

To further illustrate the invention the following examples are cited, the proportions of reactants being expressed in parts by weight.

*Example 1*

Two hundred and four parts of a polymerized wood rosin, obtained by polymerization of N wood rosin with sulfuric acid and having an acid number of 166, a drop melting point of 90° C. and a Lovibond color of 39 Amber, and 25.7 parts of maleic anhydride were admixed and heated to 200° C. and held there for 30 minutes. Then 43.7 parts of glycerol were added, and the mixture heated to 270° C., and held there until two successive acid number determinations made at one-hour intervals showed very little further drop in acid number. Throughout the heating carbon dioxide was bubbled through the mixture and volatilized materials were returned by means of a hot water reflux condenser. The reflux condenser was then removed and the batch sparged vigorously with carbon dioxide for 30 minutes. The resin was then allowed to cool to 225° C. under carbon dioxide and poured. The proportions used were such as to give on an ester basis the equivalent of 15% glyceryl maleate and 85% polymerized rosin glyceride. The finished resin had an acid number of 19, a drop melting point of 152° C. and a color of 65 Amber. It was sufficiently soluble in mineral spirits to give a 50% solution.

Example 2

Following the same procedure shown in Example 1, 1297 parts of polymerized wood rosin obtained by polymerization of N wood rosin with sulfuric acid and having an acid number of 151.5, a drop melting point of 106° C. and a color of 24 Amber, and 102 parts of maleic anhydride were first heated to form an adduct and then 222 parts of glycerol were added for the esterification. These proportions were such as to give a resin containing on the ester basis the equivalent of 10% glyceryl maleate and 90% polymerized rosin glyceride. The resin had an acid number of 11.5, a drop melting point of 150° C. and a Lovibond color of 80 Amber +0.75 Red.

Example 3

Thirteen hundred parts of polymerized rosin (obtained by polymerization of N wood rosin with sulfuric acid and refined by heat treatment at 280° C. in the presence of molecular hydrogen, having an acid number of 147, a drop melting point of 100° C. and a color of 27 Amber), and 149.5 parts of maleic anhydride were heated at 200° C. in a nitrogen atmosphere for 30 minutes to form an adduct. The mixture was then heated gradually to 270° C. over a period of 3 hours. Thirty minutes after the start of this upheat, 202 parts of glycerol were added in small portions over a period of about one hour to avoid excessive foaming. The mixture was then held at 270° C. until the acid number had dropped to about 25. The mixture was then sparged vigorously with nitrogen for 45 minutes to remove unreacted glycerol and any other volatile products. The proportions used were such as to give on an ester basis the equivalent of 13.7% glyceryl maleate and 86.3% polymerized rosin glyceride. The resin resulting had the following analysis:

| | |
|---|---|
| Acid number | 26 |
| Drop melting point | °C 169 |
| Color (Lovibond) | 40 Amber |

Example 4

A resin was prepared by heating the polymerized rosin, maleic anhydride and glycerol simultaneously as follows: The polymerized rosin used was obtained by polymerization of K wood rosin with sulfuric acid in benzol solution, followed by a refining treatment with nascent hydrogen generated by reaction of zinc with sodium acid sulfate. It had an acid number of 157, a drop melting point of 101° C. and a Lovibond color of 14 Amber. The proportions used were

| | Parts |
|---|---|
| Polymerized rosin | 216 |
| Maleic anhydride | 17 |
| Glycerol | 37 |

These reactants were heated together under a hot water reflux condenser in a carbon dioxide atmosphere to 270° C. and held there until the acid number dropped to 25, the mixture then sparged vigorously with carbon dioxide for 30 minutes, then cooled. The resin resulting had an acid number of 24, a drop melting point of 150° C. and a Lovibond color of 35 Amber. The proportions of reactants were such as to give on an ester basis the equivalent of 90% polymerized rosin glyceride and 10% glyceryl maleate, a 20% excess of glycerol over the theoretical being used. The resin was completely soluble in mineral spirits to give either dilute or concentrated solutions.

The resinous products of the present invention are widely applicable in the plastic and coating composition fields. They are especially applicable to use in coating compositions. For example, solutions thereof in suitable volatile organic solvents with or without other conventional ingredients such as driers, pigments, plasticizers, cellulose derivatives such as nitrocellulose, drying and semi-drying oils, etc., may be employed as coating compositions. They may be employed as the resinous component of oil varnishes, being cooked with a suitable drying oil, particularly the soft oils such as linseed oil, soyabean oil, Perilla oil, dehydrated castor oil, etc., the cooked mixture being cooled, thinned and admixed with suitable driers. Varnishes prepared with the resins of the present invention display improved alkali and water resistance and reduced drying times in comparison with varnishes prepared with the prior rosin modified maleate resins. The resins of the present invention are particularly advantageous because of their improved solubility and compatability characteristics, their high melting points, their good resistance to water and alkali, and other desirable properties. An important economic advantage is that for a resin of given high melting point the amount of expensive maleic anhydride may be considerably reduced over that necessary when natural rosins are used.

What I claim and desire to protect by Letters Patent is:

1. A fusible, soluble alkyd resin comprising the reaction product obtained by simultaneous heating of a polymerized rosin, an $\alpha$, $\beta$-unsaturated organic polycarboxylic acid and a polyhydric alcohol.

2. A fusible, soluble, alkyd resin comprising the reaction product obtained by simultaneous heating of a polymerized rosin, maleic anhydride and a polyhydric alcohol.

3. A fusible, soluble alkyd resin comprising the reaction product obtained by simultaneous heating of a polymerized rosin, maleic anhydride and glycerol.

4. A fusible, soluble alkyd resin comprising the reaction product obtained by simultaneous heating of a polymerized rosin, from about 1 to about 16 parts by weight of maleic anhydride for each 100 parts by weight of polymerized rosin, and glycerol.

5. A fusible, soluble alkyd resin comprising the reaction product obtained by simultaneous heating of a polymerized rosin, from about 5 to about 13.5 parts by weight of maleic anhydride for each 100 parts by weight of polymerized rosin, and glycerol.

6. The process of producing a fusible, soluble alkyd resin which comprises heating a polymerized rosin, an $\alpha$, $\beta$-unsaturated organic polycarboxylic acid and a polyhydric alcohol.

7. The process of producing a fusible, soluble alkyd resin which comprises heating a polymerized rosin and maleic anhydride at a temperature of about 160° C. to about 250° C. to form an adduct, then heating the mixture with a polyhydric alcohol at a temperature of about 200° C. to about 300° C.

8. The process of producing fusible, soluble alkyd resin which comprises heating a mixture of a polymerized rosin, maleic anhydride and a polyhydric alcohol at a temperature of about 200° C. to about 300° C.

ERNEST G. PETERSON.